United States Patent [19]

Han

[11] Patent Number: 5,274,514
[45] Date of Patent: Dec. 28, 1993

[54] PICTURE QUALITY COMPENSATING APPARATUS AND METHOD

[75] Inventor: Hong-kyu Han, Seoul, Rep. of Korea
[73] Assignee: Samsung Electronics Co., Ltd., Rep. of Korea
[21] Appl. No.: 856,740
[22] Filed: Mar. 24, 1992
[30] Foreign Application Priority Data
  Jul. 9, 1991 [KR] Rep. of Korea .................. 91-10467
[51] Int. Cl.⁵ .............................................. G11B 15/52
[52] U.S. Cl. ................................................. 360/73.13
[58] Field of Search ............... 360/73.04, 73.12, 73.13
[56] References Cited
U.S. PATENT DOCUMENTS 3,959,818  5/1976  Iketaki .................................. 360/70
4,390,977  6/1983  Onigata et al. .
4,409,628  10/1983  Frimet et al. ................. 360/73.13 X
4,672,474  6/1987  Rodal ............................ 360/73.13 X

*Primary Examiner*—Michael Koczo
*Attorney, Agent, or Firm*—Sughrue, Mion, Zinn, Macpeak & Seas

[57] ABSTRACT

A picture quality compensating apparatus and method in a video tape recorder compensates picture quality when the control signal of a tape is damaged (or omitted). For this purpose, when the control signal is damaged, the vertical sync pulse is varied so as to be identical with the control signal and is substituted therefore, thus, the phase of a capstan motor is controlled, and at the same time, auto-tracking is carried out, thereby providing a clear picture.

12 Claims, 3 Drawing Sheets

FIG. 2C

PICTURE QUALITY COMPENSATING APPARATUS AND METHOD

BACKGROUND OF THE INVENTION

The present invention relates to a picture quality compensating apparatus and method in a video signal recording/reproducing system, and particularly to a picture compensating apparatus and method for compensating degraded picture quality caused by damage to a control signal recorded on a video tape, during reproduction.

Generally, video cassette recorders (hereinafter referred to as a "VCR"), a laser players, and VCRS integrally formed within a camera (hereinafter referred to as a "camcorder," are typical examples of video signal recording/reproducing apparatus. Among these examples the VCR and camcorder use magnetic tape (video tape) as a recording medium, and the laser disc player uses an optical disc.

In a common helical scanning type VCR, the video tape has a video signal track for video signals, an audio track for audio signals, and a control track for control signals. Here, even though the control signal is able to prompt more effective reproduction by holding specific data such as a video index search system, the control signal is commonly utilized for controlling the phase of a capstan motor during reproduction. For example, 30 pulses are generated per second in an NTSC system, and 25 pulses per second in a PAL system, so that the control signal is used as reference data for controlling the phase of a capstan motor.

Accordingly, unless the control pulses defined by the above-mentioned broadcasting systems are not picked up from a control head during reproduction, a hunting phenomenon occurs, which degrades the picture.

Further, although the control signal may be compensated to prevent the degradation of the picture, the capstan is not perfectly controlled due to the phase difference between the compensating waveform and the original control signal. Especially, since the track itself is deviated once hunting occurs, the degrading of the picture may be prevented by compensating for the control pulse, but the tracking error remains uncompensated, so that an optimum picture cannot be displayed.

SUMMARY OF THE INVENTION

Accordingly, it is an object of the present invention to provide a picture quality compensating apparatus and method, wherein the damage to the control signal on the video tape is compensated during reproduction, using a vertical sync signal separated from a reproduced video signal, thereby providing a picture in the optimum condition.

It is another object of the present invention to provide a picture quality compensating apparatus and method for optimally compensating a picture, wherein, while compensating for the damage to a control pulse, tracking is fixed by searching an optimal point of a picture using an auto-tracking control, thereby providing a picture in the optimum condition.

To achieve these and other objects of the present invention, there is provided a picture quality compensating apparatus in a video tape recorder including a video reproducer which has an envelope detector for reproducing a video signal picked up from a video tape via a playback head; a servo having a capstan motor for controlling the speed and phase of the video tape; and a control head for picking up a control signal recorded on the control track of the video tape, the apparatus comprising.

a control signal generator for amplifying and waveform-shaping of the pulses of the control signal picked up by the control head and outputting the processed pulses;

a pseudo control signal generator for separating a vertical sync signal from the video signal output from the video reproducer, and shaping the separated signal into the identical pulse form of the signal from the control signal generator and outputting it;

phase control signal selecting means for selectively outputting the output signals from the control signal generator and pseudo control signal generator as the capstan phase control signal of the servo; and a system controller for counting the number of pulses of the output signal from the control signal generator, and controlling the phase control signal selecting means to allow the output signal from the pseudo control signal generator to be outputted to the servo when the counted value is smaller than a predetermined value.

Also, there is provided a picture quality compensating method including the step of controlling the phase of a capstan motor using control signal picked up through a control head during reproduction, the method comprising the steps of:

counting the control signal for a predetermined period;

checking whether or not the control signal is damaged by comparing the counted value in the counting step with a predetermined reference value; and first phase controlling for controlling the phase of the capstan motor using a pseudo control signal obtained from a vertical sync signal detected from a reproduced video signal when damage is detected in the damage checking step.

Additionally, the method further comprises the step of controlling the auto-tracking at the initial point of the first phase controlling step using an envelope value detected from the reproduced video signal when damage is detected in the damage checking step.

BRIEF DESCRIPTION OF THE DRAWINGS

The objects and features of the present invention will become more readily apparent from the following detailed description of the preferred embodiments taken in conjunction with the accompanying drawings, in which:

FIGS. 2A through 2E are waveforms at important portions of the apparatus shown in FIG. 1.

DETAILED DESCRIPTION OF THE PREFERRED EMBODIMENTS

Figure 1:
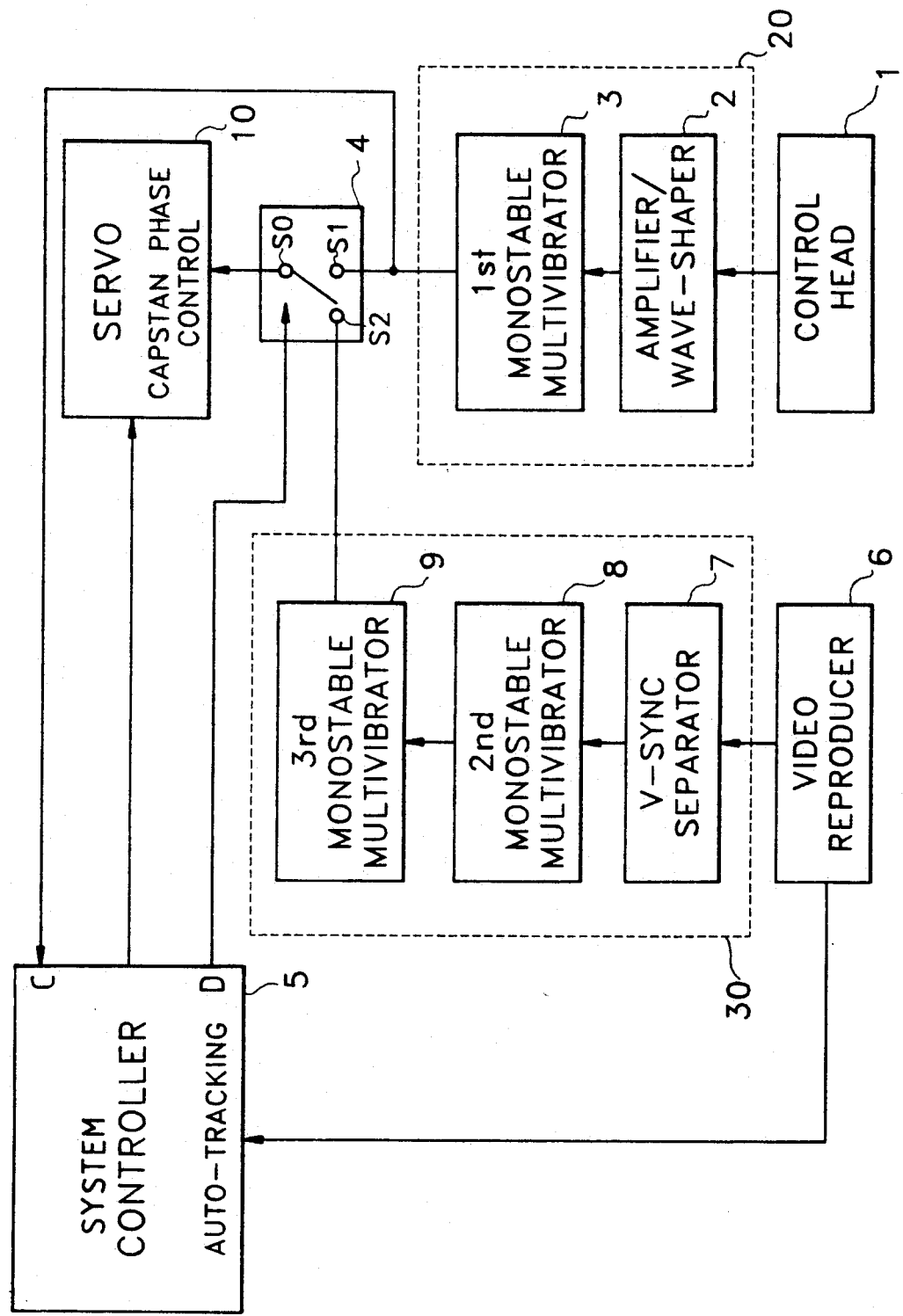
FIG. 1 is a block diagram of a apparatus according to the present invention.

FIG. 1 illustrates a picture quality compensating apparatus of the present invention, adapted to a video signal recording/reproducing system in which the recording medium is a video tape.

The picture quality compensating apparatus in FIG. 1 is composed of: a control head 1 for picking up information from a control track of a video tape (not shown); a control pulse generator 20 which amplifies the output signal of control head 1, performs waveform-shaping, and detects the positive area of pulses to provide an output; a video reproducer 6 for picking up information from a video signal track of the video tape through a video head so as to reproduce the information as a composite video signal, and outputting it; a pseudo control pulse generator 30 which detects a vertical sync signal within the output signal of video reproducer 6, and performs waveform-shaping to output a pulse having the identical form to the output signal from control pulse generator 20; a servo 10 having a capstan motor for controlling the speed and phase of the video tape; a control switch 4 having a first contact S1 connected to the output signal of control pulse generator 20, a second contact S2 connected to the output signal of pseudo control pulse generator 30, and a reference contact S0 at a phase control node of the capstan motor; and a system controller 5 which counts the output signal of control pulse generator 20, controls the operation of control switch 4 by determining the damage to the control signal, and supplies tracking control data to servo 10 in accordance with an envelope value from video reproducer 6, and controls the overall functions of the video signal recording/reproducing system.

Particularly, video reproducer 6 amplifies the information picked up from the video tape by a predetermined amount through a pre-amplifier (not separately shown), and reproduction is performed by supplying the information to a general video signal demodulator (not separately shown) and an envelope detector (not separately shown). In the embodiment of the present invention, the DC value output from the envelope detector is supplied to system controller 5, and the signal from the video signal demodulator is supplied to vertical sync separator 7 which will be described in detail later.

Also, control signal generator 20 is composed of an amplifier/waveform-shaping circuit 2 whose input is connected to the output of control head 1, and a first monostable multivibrator 3 whose input is connected to the output of amplifier/waveform-shaping circuit 2 and whose output is connected to first contact S1 of control switch 4.

Pseudo control signal generator 30 has a vertical sync separator 7 whose input is connected to the output of video reproducer 6, a second monostable multivibrator 8 whose input is connected to the output of vertical sync separator 7, and a third monostable multivibrator 9 whose input is connected to the output of second monostable multivibrator 8 and whose output is connected to second contact S2 of control switch 4.

Figure 2A:
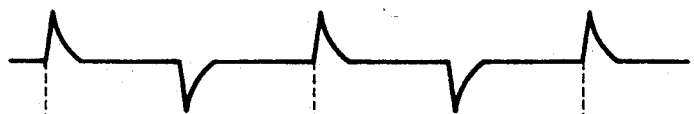

FIGS. 2A through 2E are output waveforms of the important portions of the apparatus of FIG. 1, wherein FIG. 2A shows control pulses picked up by control head 1; 2B shows pulses output from control pulse generator 20; 2C shows pulses from vertical sync separator 7; 2D shows output pulses of second monostable multivibrator 8; and 2E shows output pulses of third monostable multivibrator 9.

Figure 3:
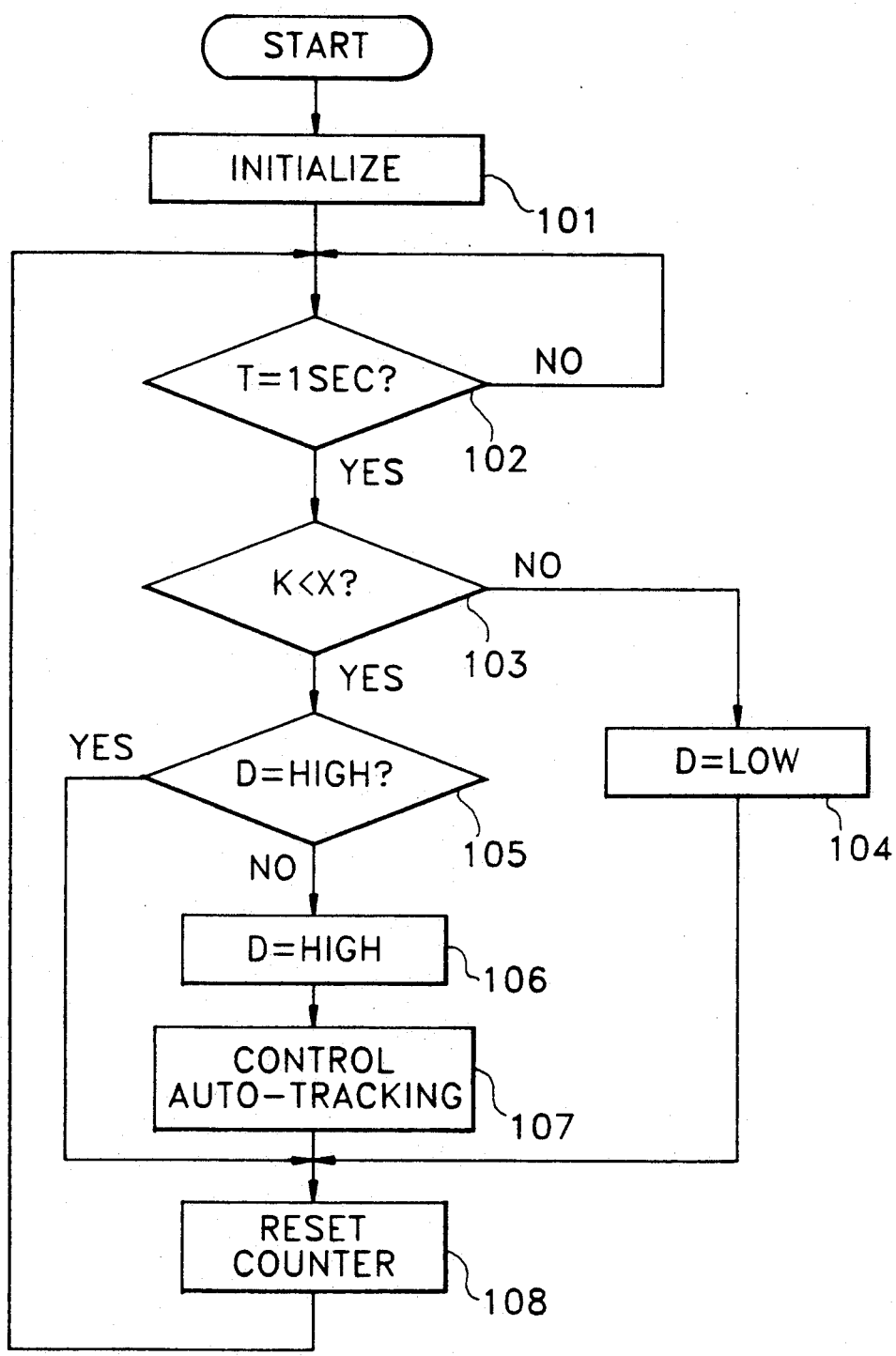
FIG. 3 is a flowchart illustrating the process performed by the system controller of the apparatus shown in FIG. 1.

FIG. 3 is a flowchart showing the picture quality compensating method carried out in the system controller of FIG. 1.

The operation of the apparatus of FIG. 1 will now be described in detail with reference to FIGS. 2 and 3.

When power is applied, system controller 5 initializes the system. Here, the mode is set to reproduction, a count-register (not shown) for counting control pulses and a timer (not shown) for controlling the time of the count-register are reset, and a signal for controlling the state of control switch 4 is reset to a logic "low" (step 101).

While in the reproduction mode, control head 1 picks up the control pulses shown in FIG. 2A.

Figure 2B:
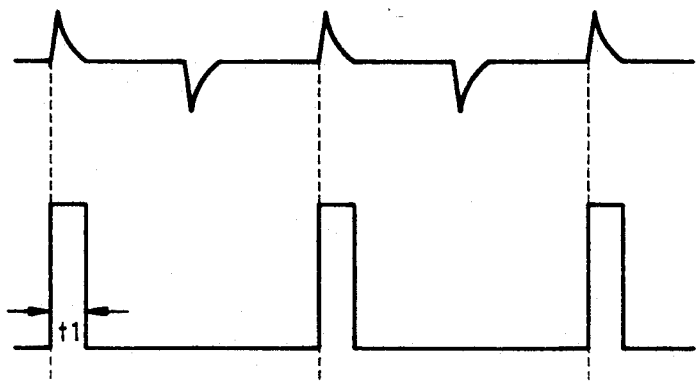

When the pulses shown in FIG. 2A are supplied from control head 1, control pulse generator 20 performs amplification by a predetermined amount and waveform-shaping of the received pulses via amplifier/waveform-shaping circuit 2 to generate the pulses shown in FIG. 2B, and then outputs the processed pulses through first monostable multivibrator 3.

Figure 2D:
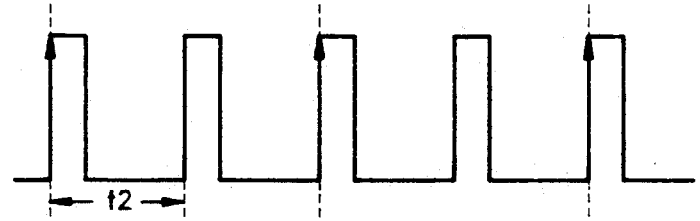
Figure 2E:
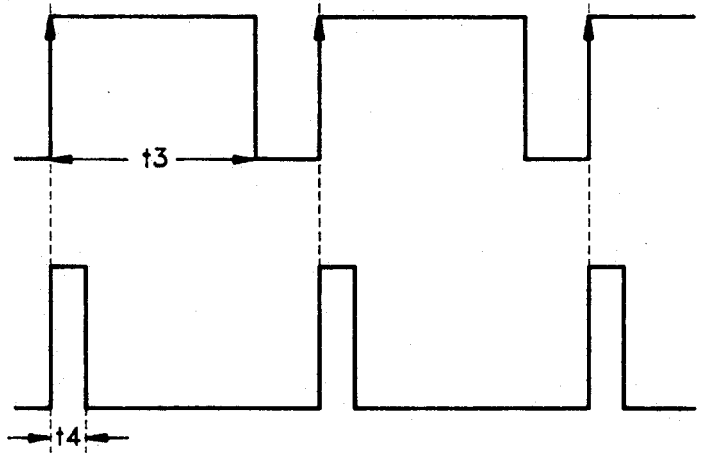

Pseudo control pulse generator 30 is employed to generate pulses from a composite video signal from video reproducer 6. Here, the pulse form is identical to the signal from control pulse generator 20. That is, a vertical sync signal as shown in FIG. 2C is output after being separated from the composite video signal supplied to vertical sync separator 7. While maintaining a logic "high" for one period or more, second monostable multivibrator 8 converts the supplied vertical sync signal (FIG. 2C) as shown in FIG. 2D. In other words, if the period t2 shown in FIG. 2C is 1/60 second, t3 is selected to satisfy the following inequality $1/50 \text{ sec} < t3 < 1/30 \text{ sec}$. When the output signal from second monostable multivibrator 8 is supplied as shown in FIG. 2D, third monostable multivibrator 9 outputs the waveform shown in FIG. 2E using a predetermined time constant, which is identical to the waveform of FIG. 2B. Here, first and third monostable multivibrators 3 and 9 are composed of devices having the same time constant.

Control switch 4 selectively outputs a signal selected from the signals supplied through first and second contacts S1 and S2 to the phase control node of the capstan motor included in servo 10 in accordance with the control signal from system controller 5, which will be described later, so that regular phase control is carried out.

Meanwhile, when system controller 5 receives the signal from control pulse generator 20 through an input C, the count-register begins counting. At this time, the counting period is controlled by the built-in timer, and the reference time is set to one second. After one second elapses (step 102), the currently counted value is estimated.

That is, if the counted value of the input pulses is "K", and a threshold where the output control signal is determined as being damaged is set to "X", if "K" is smaller than "X", it is determined that something in the picture is amiss (step 103).

At this time, since damage to two or three control pulses does not substantially affect picture quality, "X" can be set to 27 (30 is the normal state) for an NTSC system, and 22 (25 is the normal state) for a PAL system. Therefore, when "K" is greater than or equal to "X", the state is determined as being normal (step 103). Accordingly, system controller 5 maintains the previous setting state (that at initialization), so that the control signal supplied to control switch 4 via output D is a logic "low" (step 104).

However, if "K" is smaller than "X", a high logic control signal is output to control switch 4 via output D (steps 105 and 106). By this operation, control switch 4 supplies a pseudo control signal from pseudo control pulse generator 30 as the capstan phase control signal of servo 10, which enables regular phase controlling, so that the picture quality is compensated.

Also, while altering the tracking during the ½ period of the initial control head switching in accordance with envelope values from video reproducer 6 when damage occurs, system controller 5 fixes the tracking to a maximum value of the supplied envelope (step 107). Then, the count-register is reset, and the control pulses generated in one second are counted. Thereafter, steps 102 through 108 are repeated.

In the present invention as described above, when a video tape with a damaged control signal is reproduced, the damage is compensated using the vertical sync signal of the reproduced signal. At the same time, auto-tracking is controlled at the initial point where the damage appears, thereby fixing the tracking at the optimal point of the picture. As a result, a clear picture can be provided.

What is claimed is:

1. A picture quality compensating apparatus for a video tape recorder/player which reproduces a video signal picked up from a video tape via a playback head, including a servo having a capstan motor for driving said video tape and a control head for picking up a control signal recorded on a control track of said video tape, said apparatus comprising:

a control signal generator for amplifying and waveform-shaping pulses of said control signal picked up by said control head and generating an output signal;

a pseudo control signal generator for separating a vertical sync signal from said video signal output from said video recorder/player, and shaping said separated signal into the identical pulse form of said output signal from said control signal generator;

phase control signal selecting means for selectively outputting an output signal from either said control signal generator or said pseudo control signal for said servo; and a system controller for counting the number of pulses of said output signal from said control signal generator, and controlling said phase control signal selecting means to allow the output signal from said pseudo control signal generator to be output to said servo when the counted value is smaller than a predetermined value.

2. A picture quality compensating apparatus as claimed in claim 1, wherein, when said system controller causes the pseudo control signal to be supplies to said servo, a value corresponding to an altered tracking value is supplied to said servo in accordance with a value detected in an envelope detector of said recorder/player.

3. A picture quality compensating apparatus as claimed in claim 2, wherein a tracking control period is set as ½ of an initial head switching period when said counted value is smaller than said predetermined value.

4. A picture quality compensating apparatus as claimed in claim 1, wherein said control signal generator comprises an amplifier/waveform-shaping circuit for amplifying and waveform-shaping said signal picked up by said control head by a predetermined amount, and a first pulse generator for generating pulses by adjusting the positive area of output signal pulses from said amplifier/waveform-shaping circuit by a predetermined time constant.

5. A picture quality compensating apparatus as claimed in claim 4, wherein said first pulse generator is a monostable multivibrator.

6. A picture quality compensating apparatus as claimed in claim 1, wherein said pseudo control signal generator comprises:

a vertical sync separator for separating said vertical sync signal from said, video signal from said video recorder/player; and a first pulse generator for adjusting said vertical sync signal from said vertical sync separator by shaping its period according to a predetermined time constant.

7. A picture quality compensating apparatus as claimed in claim 6, wherein said first pulse generator is composed of at least one monostable multivibrator.

8. A picture quality compensating apparatus as claimed in claim 4, wherein said pseudo control signal generator comprises:

a vertical sync separator for separating said vertical sync signal from video signal from said video recorder/player; and a second pulse generator for adjusting said vertical sync signal from said vertical sync separator by shaping its period according to a predetermined time constant.

9. A picture quality compensating apparatus as claimed in claim 8, wherein said second pulse generator is composed of at least one monostable multivibrator.

10. A picture quality compensating apparatus as claimed in claim 9, wherein said monostable multivibrator for generating the output of said second pulse generator and said first pulse generator are composed of devices having the identical time constant.

11. A picture quality compensating method for controlling the phase of a capstan motor using a control signal, comprising the steps of:

counting pulses of said control signal for a predetermined period of signal reproduction;

checking whether or not said control signal is damaged by comparing the counted value from said counting step with a predetermined reference value; and first phase controlling for controlling the phase of said capstan motor using a pseudo control signal derived from a vertical sync signal separated from a reproduced video signal when damage is detected in said damage checking step.

12. A picture quality compensating method as claimed in claim 11, wherein said picture quality compensating method further comprises the step of controlling the auto-tracking at the initial point of said first phase controlling step using an envelope value detected from, said reproduced video signal when damage is detected in said damage checking step.

* * * * *